(12) United States Patent
Akagawa

(10) Patent No.: US 6,901,796 B2
(45) Date of Patent: Jun. 7, 2005

(54) FLUID LEVEL DETECTING DEVICE

(75) Inventor: Satoshi Akagawa, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/822,765

(22) Filed: Apr. 13, 2004

(65) Prior Publication Data
US 2004/0226367 A1 Nov. 18, 2004

(30) Foreign Application Priority Data

May 15, 2003 (JP) ........................................ 2003-137906

(51) Int. Cl.[7] ......................... G01F 23/60; G01F 23/30; G01F 23/32
(52) U.S. Cl. .............................. 73/313; 73/314; 73/317
(58) Field of Search ......................... 73/313, 314, 317, 73/305; 340/620

(56) References Cited

U.S. PATENT DOCUMENTS 6,711,950 B1 * 3/2004 Yamaura et al. .............. 73/317

FOREIGN PATENT DOCUMENTS

| JP | A-9-5145 | 1/1997 | |
| JP | 09005145 A | * 1/1997 | ........... G01F/23/36 |

* cited by examiner

Primary Examiner—Hezron Williams
Assistant Examiner—Tamiko Bellamy
(74) Attorney, Agent, or Firm—Posz Law Group, PLC

(57) ABSTRACT

A fuel level sensor includes a float, a float arm, a float arm holder, and a sliding contact. The float arm holder is made of conductive resin. Therefore, the float arm and the sliding contact are electrically connected with each other via the float arm holder and maintained at the same potential. Even when static builds up on the float due to riffle of the fuel surface, the static is not discharged between the float arm and the sliding contact. As a result, output signals of the fuel level sensor are not distorted by the static and accuracy in the fuel level detection is maintained.

7 Claims, 2 Drawing Sheets

FLUID LEVEL DETECTING DEVICE

CROSS REFERENCE TO RELATED APPLICATION

This application is based on and incorporates herein by reference Japanese Patent Application No. 2003-137906 filed on May 15, 2003.

FIELD OF THE INVENTION

The present invention relates to a fluid level detector for detecting a level of fluid stored in a container.

BACKGROUND OF THE INVENTION

A fluid level detector is used in a fuel tank of a vehicle for detecting a fuel level in the tank. The fluid level detector has a float, a float arm, a float arm holder, a main body, an electrical resistance element, and a sliding contact. The float arm supports the float floated on the fluid. The float arm holder and the main body hold the float arm and the float arm holder in a manner that the float arm is rotatable, respectively.

The electrical resistance element having an end that is electrically connected to an external circuit is fixed to the main body. The sliding contact slides on the resistance element according to rotation of the arm holder while it is pressed against the resistance element. The fluid level is detected by measuring an electrical resistance between the sliding contact and the end of the resistance element.

When the fuel surface is riffled due to vibration of the vehicle, relative movement occurs between the float and the fuel. As a result, static builds up due to friction between the float surface and the fuel. If the arm holder is made of non-conductive material such as resin as proposed in JP-A-9-5145, the static charges on the float arm. If the static is discharged between the float arm and the sliding contact, output signals from the fluid level detector are distorted. As a result, accuracy of the fluid level detector decreases.

SUMMARY OF THE INVENTION

The present invention therefore has an objective to provide a fluid level detector that maintains accuracy in fluid level detection even when static is charged on a float. A fluid level detecting device of the present invention includes a float, a float arm, a resin arm holder, a main body, an electrical resistance element, a sliding contact, and an electrical connector member.

The float is floated on fluid and the float arm is provided for supporting the float. The resin float arm holder is provided for holing the float arm. The arm holder is supported by the main body in the manner that it is rotatable. The resistance element having an end that is electrically connected to an external circuit is fixed to the main body. The sliding contact is pressed against the resistance element to have electrical contact with the resistance element and electrically connected to an external circuit. It develops the electrical resistance that varies as it slides on the electrical resistance element according to the rotation of the float arm. The connector member electrically connects the float arm with the sliding contact. The fluid level is detected by measuring the electrical resistance between the sliding contact and the end of the resistance element.

When a tank that stores the fuel is under vibration and the fuel surface is riffled, static builds up due to friction between the float surface and the fuel. The static is immediately transmitted from the float arm to the sliding contact via the connector member, and to an external circuit. Namely, the float arm and the sliding contact are maintained at the same potential.

In a known fuel level detecting device, its output signals are distorted when discharge of the static occurs between a metal float arm and a sliding contact. However, output signals of the fuel level detecting device having the above-described configuration are not distorted by the static. Thus, the accuracy in the fuel level detection is maintained.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
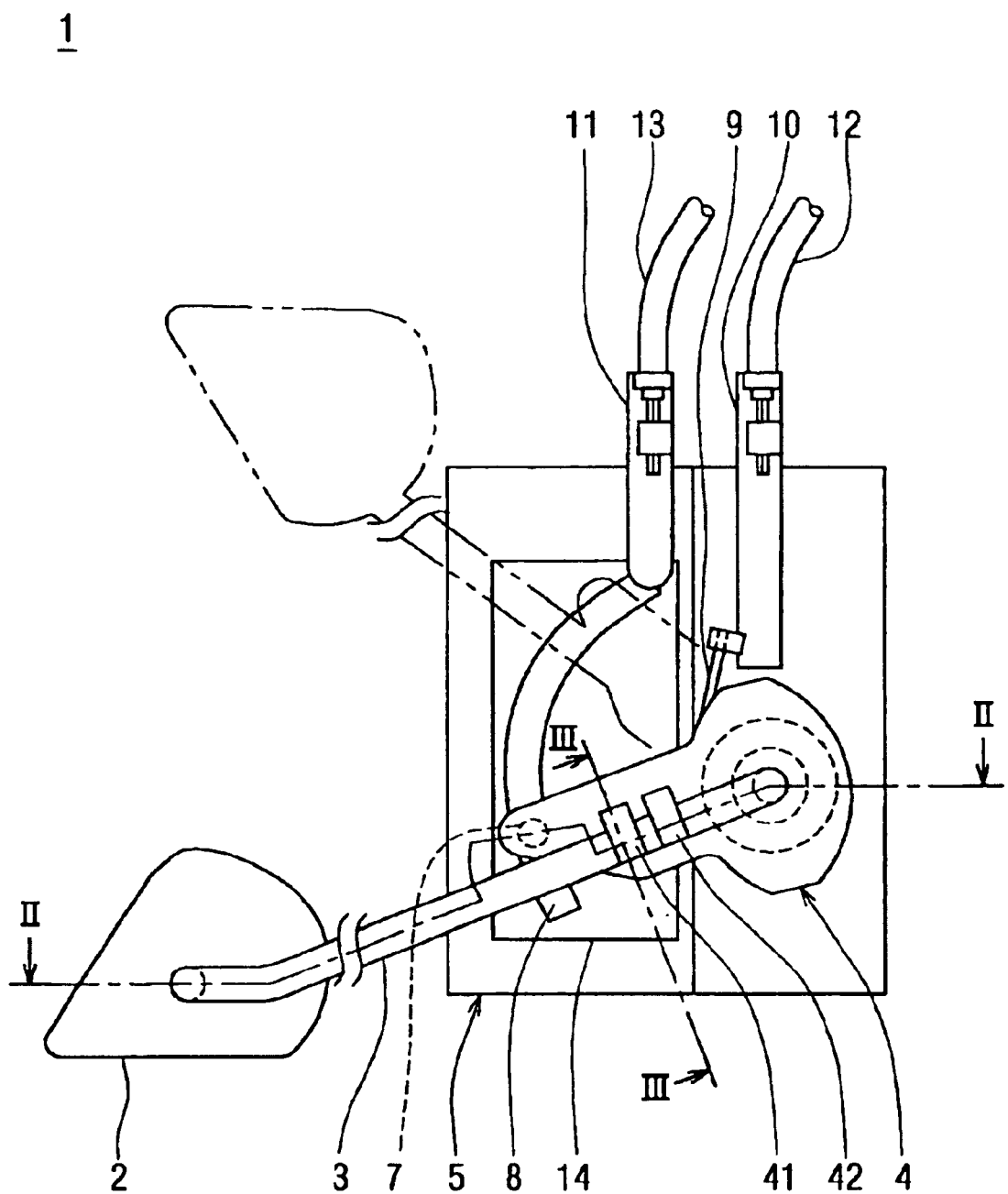
FIG. 1 a front view of a fuel level sensor according to an embodiment of the present invention.

The preferred embodiments of the present invention will be explained with reference to the accompanying drawings. In the drawings, the same numerals are used for the same components and devices.

[First Embodiment]

Figure 2:
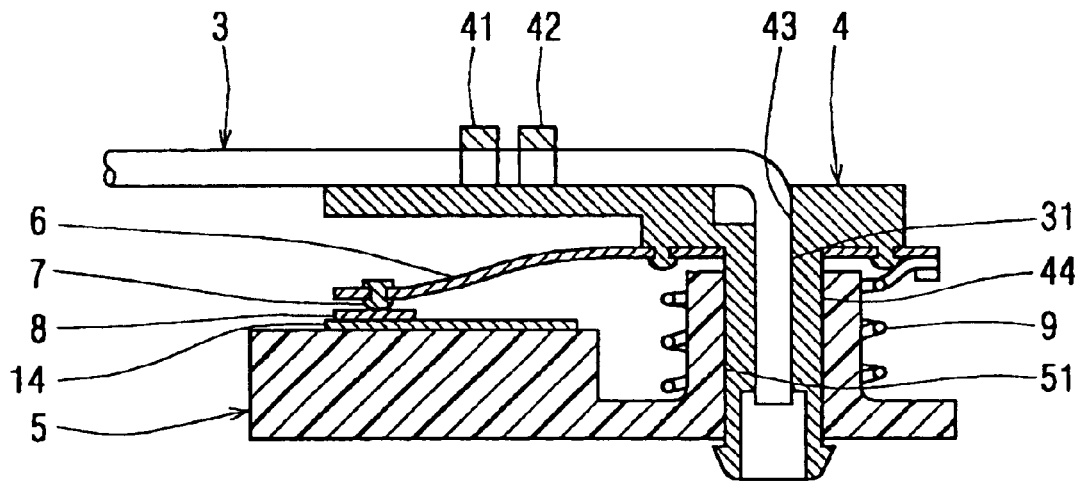
FIG. 2 is a cross-sectional view of the fuel level sensor sectioned by line II—II according to the first embodiment.

A fluid level sensor used as a fuel level sensor for detecting a fuel level in a fuel tank of a vehicle will be discussed referring to FIGS. 1 and 2. FIG. 1 shows the fuel level sensor 1 in a position that the fuel level sensor 1 is fixed to a bracket (not shown) provided in a fuel tank (not shown) of a vehicle.

A fuel level sensor 1 includes a float 2, a float arm 3, a float arm holder 4, a frame 5, a sliding contact 7, and an electrical resistance element 8. The fuel level sensor 1 is installed in the vehicle in a position shown in FIG. 1. When the fuel tank is empty and the fuel level is at the minimum, the float 2 is at a low position as indicated with solid lines. When the fuel tank is full and the fuel level is at the maximum, the float 2 is at a high position as indicated with two-dot chain lines.

The float 2 is made of resin and its apparent specific gravity is set so that it appropriately floats on the fuel. The float 2 moves up and down according to variations in the fuel level. The float arm 3 is made of metal, such as iron, and formed in a rod. The first end and the second end of the float arm 3 are connected with the float 2 and the arm holder 4, respectively. The second end of the float 3 is bent and referred to as a bend 31. The float arm 3 rotates according to the up and down movement of the float 2.

The arm holder 4 that holds the float arm 3 is made of conductive resin. The conductive resin is a resin mixed with conductive substances to add conductivity. The arm holder 4 has locking lugs 41 and 42 with which the float arm 3 is secured and a hole 43 in which the bend 31 of the float arm 3 is inserted. The arm holder 4 also has a shaft 44 that is inserted in a hole 51 of the frame 5 as shown in FIG. 2 in the manner that the arm holder 4 is rotatable. The arm holder 4 rotates with the float arm 3 according to the up and down movement of the float 2.

A metal plate 6 is fixed to the arm holder 4. The contact 7 is fixed to the first end of the plate 6 and pressed against the resistance element 8 for establishing contact. A spring 9 is coaxially arranged with the shaft 44 of the arm holder 4. Its first end and the second end are fixed to the second end of the plate 6 and the terminal 10, respectively. A lead wire 12 is connected with the terminal 10 by crimping. The contact 7 is electrically connected with an external circuit via the lead wire 12.

When the plate 6 is attached to the arm holder 4 together with the float arm 3 and the contact 7, the float arm 3 and the contact 7 are electrically connected with each other via the arm holder 4. The arm holder 4 is an electrical connector member that electrically connects the float arm 3 with the contact 7.

The plate 6 is a thin plate made of phosphor bronze or beryllium copper that is less likely to lose spring tension with time when the plate 6 is configured a spring. Moreover, the phosphor bronze or the beryllium copper has high conductivity. The plate 6 is configured as a flat spring so that it presses the contact 7 against the resistance element 8 with the appropriate amount of force. A flat portion of the plate 7 is formed in the shape substantially the same as that of the arm holder 4. The appropriate amount of force is the amount that contact resistance between the contact 7 and the resistance element remains low with stability.

The contact 7 is made of silver so that the contact resistance with the resistance element 8 does not vary with time. It can be made of other materials as long as the contact resistance does not vary with time. The spring 9 is made with a wire having a predetermined diameter turned at predetermined numbers of times so that resistance is adequately low in the rotation of the arm holder 4. By setting the resistance low, the arm holder 4 smoothly rotates corresponding to the variations in the fuel level.

The frame 5 is a main body of the fuel level sensor 1 and made of resin. It holds the arm holder 4 in the manner that the arm holder 4 is rotatable. The resistance element 8 is formed in a shape of an arc on a track of the contact 7 as a pattern on a ceramic substrate 14 that is fixed to the frame 5. The arc pattern of the resistance element 8 is a segment of a circle, the center of which is the same as that of the hole 51.

The contact 7 is continuously pressed against the resistance element 8 during the rotation of the arm holder 4. Namely, the contact 7 maintains contact with the resistance element 8 and develops the electrical resistance. The electrical resistance varies as the contact 7 slides on the resistance element 8 according to the rotation of the arm holder 4. A terminal 11 is crimped onto a lead wire 13 and connected with the end of the resistance element 8. The resistance element 8 is electrically connected to an external circuit via the lead wire 13.

When the fuel tank is full and the fuel level is at the maximum, the float 2 is at the high position as indicated with two-dot chain lines. As a result, a length of the arc of the resistance element 8 between the contact 7 and the terminal 11 is short and the resistance between the terminals 10 and 11 becomes the minimum.

When the fuel is consumed by the vehicle and the fuel level is lowered, the float 2 moves downward as indicated with solid lines and the arm holder 4 rotates counterclockwise. The length of the arc of the resistance element 8 between the contact 7 and the terminal 11 increases as the arm holder 4 rotates counterclockwise. Because the resistance between the terminals 10 and 11 increases as the length between the contact 7 and the terminal 11 increases, the fuel level is detected by measuring the resistance.

When the fuel surface is riffled due to vibration of the vehicle, relative movement occurs between the float 2 and the fuel. As a result, static builds up due to friction between the float surface and the fuel. If the arm holder 4 is made of non-conductive material such as resin, the static charges on the float arm 3. If the static is discharged between the float arm 3 and the contact 7, output signals of the fuel level detector 1 are distorted and accuracy of the fuel level sensor 1 decreases.

However, the arm holder 4 is made of conductive resin and the float arm 3 and the contact 7 are electrically connected to each other via the arm holder 4. The float arm 3 and the contact 7 are maintained at the same potential. Therefore, the static between the float arm 3 and the contact 7 is not discharged. Moreover, the fuel level sensor 1 is not electrically charged because the static on the float 2 caused by the riffle of the fuel surface is dissipated to the ground via the contact 7 and the resistance element 8. With this configuration, output signals of the fuel level sensor 1 are not distorted even when the static is discharged. Therefore, the accuracy of the fuel level detector 1 is maintained.

Furthermore, the cost of the fuel level sensor 1 is not much higher than that of the known fluid level detecting device because no additional parts are required. The fuel level sensor 1 that maintains the accuracy in the fuel level detection is provided by simply applying a conductive material to the arm holder 4.

[Second Embodiment]

Figure 3:
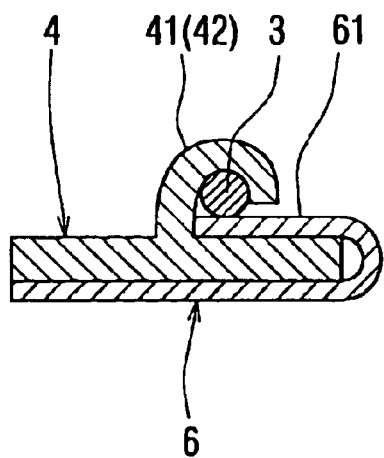
FIG. 3 is a cross-sectional view of the fuel level sensor sectioned by line III—III according to the second embodiment of the present invention.

Referring to FIGS. 1 and 3, the float arm 3 and the contact 7 are electrically connected to each other via the plate 6. A part of the plate 6 is extended to form an electrical connector portion 61. The connector portion 61 is electrically connected with the float arm 3. With this configuration, output signals of the fuel level sensor 1 are not distorted even when the static is discharged. Therefore, the accuracy of the fuel level detector 1 is maintained.

The present invention should not be limited to the embodiment previously discussed and shown in the figures, but may be implemented in various ways without departing from the spirit of the invention. For example, the plate 6 may be made of metal other than phosphor bronze or beryllium copper. The contact 7 may be made of conductive materials having high corrosion resistance and high wear resistance other than silver. The frame 5 can be made of metal. The fuel level detector 1 may be used for a fuel tank for a home heater or various fixed fluid storage tanks. The fluid level sensor 1 can be used for detecting levels of water, lubricating oil or various kinds of chemical agents.

What is claimed is:

1. A fluid level detecting device for detecting a fluid level by measuring an electrical resistance comprising:

a float that is floated on fluid so that the float moves up and down according to variation in the fluid level;

a float arm that is arranged to support the float and rotate according to the up and down movement of the float;

a conductive resin float arm holder that is arranged to hold the float arm;

a main body that is arranged to hold the float arm holder in a manner such that the float arm holder is rotatable;

an electrical resistance element that is fixed to the main body and electrically connected to an external circuit;

a sliding contact that is fixed to the float arm holder and electrically connected to an external circuit; and an electrical connector member that is arranged to electrically connect the float arm with the sliding contact, wherein the sliding contact slides on the electrical resistance element according to the rotation of the float arm while maintaining contact with the electrical resistance element, the sliding contact and the electrical resistance element develop an electrical resistance therebetween, the electrical resistance varying as the sliding contact slides on the electrical resistance element, and the conductive resin float arm holder electrically connects the float arm with the electrical resistance element via the sliding contact and the electrical connector member.

2. A fluid level detecting device for detecting a fluid level by measuring an electrical resistance comprising:

a float that is floated on fluid so that the float moves up and down according to variation in the fluid level;

a float arm that is arranged to support the float and rotate according to the un and down movement of the float;

a resin float arm holder that is arranged to hold the float arm;

a main body that is arranged to hold the float arm holder in a manner such that the float arm holder is rotatable;

an electrical resistance element that is fixed to the main body and electrically connected to an external circuit;

a sliding contact that is electrically connected to an external circuit; and an electrical connector member that is arranged to electrically connect the float arm with the sliding contact, wherein the sliding contact slides on the electrical resistance element according to the rotation of the float arm while maintaining contact with the electrical resistance element, the sliding contact and the electrical resistance element develop an electrical resistance therebetween, the electrical resistance varying as the sliding contact slides on the electrical resistance element, and the electrical connector member has an extended portion, and the extended portion is directly and electrically connected with the float arm.

3. The fluid level detecting device according to claim 1, wherein the electrical resistance element is formed in a shape of an arc on a track of the sliding contact.

4. The fluid level detecting device according to claim 1, wherein the electrical resistance is measured between the sliding contact and the end of the electrical resistance element.

5. The fluid level detecting device according to claim 1, wherein:

the electrical connector member has a first and a second end;

the first end is directly and electrically connected to the sliding contact; and the second end is directly and electrically connected to the arm holder.

6. The fluid level detecting device according to claim 1, further comprising a terminal, wherein:

the terminal is electrically connected to a lead wire; and the electrical resistance element is grounded via the lead wire.

7. The fluid level detecting device according to claim 6, wherein:

the lead wire is electrically connected to the external circuit; and the electrical resistance element is electrically connected to the external circuit via the lead wire.

* * * * *